United States Patent [19]
Warm et al.

[11] Patent Number: 5,600,434
[45] Date of Patent: Feb. 4, 1997

[54] APPARATUS FOR DEFENDING AGAINST AN ATTACKING MISSILE

[75] Inventors: Berndt Warm, Nürnberg; Detlev Wittmer, Lauf; Matthias Noll, Eckental, all of Germany

[73] Assignee: Diehl GmbH & Co., Nürnberg, Germany

[21] Appl. No.: 380,058

[22] Filed: Jan. 30, 1995

[30] Foreign Application Priority Data

Jan. 31, 1994 [DE] Germany .......................... 44 02 855.5
Aug. 31, 1994 [DE] Germany .......................... 44 30 830.2

[51] Int. Cl.$^6$ .................. B64D 1/04; G01J 1/20; G01C 21/02
[52] U.S. Cl. .................. 356/139.08; 89/1.11; 250/201.9; 250/203.2
[58] Field of Search .................. 356/141.1, 139.08; 250/201.9, 203.2; 89/1.11

[56] References Cited

U.S. PATENT DOCUMENTS

| | | |
|---|---|---|
| 3,514,776 | 5/1970 | Mulready . |
| 3,946,233 | 3/1976 | Erben et al. . |
| 5,198,607 | 3/1993 | Livingston et al. .................. 89/1.11 |

FOREIGN PATENT DOCUMENTS

| | | |
|---|---|---|
| 0127870 | 12/1984 | European Pat. Off. . |
| 2318453 | 2/1977 | France . |
| 2505505 | 5/1981 | France . |
| 2535466 | 5/1984 | France . |
| 2689252 | 10/1993 | France . |
| 0161799 | 12/1978 | Japan . |
| 4086499 | 3/1992 | Japan . |

*Primary Examiner*—Stephen C. Buczinski
*Attorney, Agent, or Firm*—Scully, Scott, Murphy & Presser

[57] ABSTRACT

Craft (11) generally and in particular the transport aircraft (11) which are used for humanitarian purposes and for supplying crisis reaction forces over militarily unknown territory and which have comparatively little manoeuverability are particularly endangered by partisans who operate out of cover with modern portable guided missiles (12), against whose homing heads (13) the flares which were previously discharged from aircraft (11) no longer afford an effective defence. Therefore those and other potentially endangered craft (11) are provided with easily interchangeably and autarchically equipped containers (17) from which the defence beam (16) of a laser source (21) in accordance with pre-guidance by a warning sensor (10), are directed by way of the tracking optical system (19) of a target tracking system (20) on to the approaching guided missile (12) whose homing head (13) is already locked on to heat sources such as for example the engines of the craft (11) to be protected. For quickly and reliably detecting the guided missile (12) which is initially only in the form of a point, against the clutter background, the tracking camera is so-to-speak scanned stroboscopically on to the pulsating reflections of the defence beam (16) at the missile (12). The energy which is emitted towards the attacking missile (12) disturbs the optronic detector function in the homing head (13) by the clock of a pulsed beam (16). Superimposed thereon, in the event of a closer approach, is overloading of the IR-detector by the beam frequency which is in the working band of the homing head (13) and finally thermal destruction of the homing head (13) if the attacking missile (12) has not already previously deflected out of its path of attack due to the failure of its target tracking regulating loop. A continuous-wave illumination beam (40) of lower power and which is spectrally adjacent and which tracks on to a glint somewhat away from the defence beam (16) also serves with its reflection energy for actuation of the topography of an adaptive optical system (42) for compensating for atmospheric propagation disturbances.

10 Claims, 5 Drawing Sheets

APPARATUS FOR DEFENDING AGAINST AN ATTACKING MISSILE

BACKGROUND OF THE INVENTION

1. Field of the Invention

The invention concerns an apparatus for defending against a missile attacking a craft with a thermal-optronic housing head for target tracking, wherein the optronic seeking or homing head of the missile to be defended against can operate in the range of the electromagnetic radiation spectrum from the ultraviolet to infrared.

2. Discussion of the Prior Art

It is therefore known (see the journal PM, Issue 7/1988, pages 48 to 57, in particular paragraph 2 in the right-hand column on page 50) for the homing head of an attacking air target missile to be blinded or diverted by the discharge of very bright and hot light bodies (so-called flares) from the threatened craft. Modem missile target tracking apparatuses however are already provided with sensors for distinguishing between flares and targets, for example by virtue of target contour image processing. They can therefore scarcely still be deflected by punctiform heat sources. That also applies in a corresponding fashion in relation to light-up ray sources for the irritation of UV-homing heads (see German patent specification No 41 07 533).

It is known from German laid-open application (DE-OS) No 36 23 808 for a high-energy laser beam to be held on a target point, once it has been detected, by way of a tracking regulator and an adaptive optical system for optimisation of the energy distribution over the beam cross-section, even when the target moves or when the reflection thereof, which is utilised for the tracking regulation effect, decreases, by virtue of the desired destruction of the equipment at the target point. Such a system appears to be well-suited for stationary or at any event land-bound lasers in terms of use against aircraft and large missiles; in order however to repel an attack by missiles against sea vessels or even aircraft, it would not be realistic to fit such systems for example to transport airplanes which have to be brought into use quickly for humanitarian purposes or for supplying crisis reaction forces and which are then required to fly over militarily unknown territory from which they can be put at extreme risk by partisans or rebels equipped with modern small-calibre air defense missiles.

In consideration of those factors, the present invention is based on the technical object of providing an effective defense apparatus with which potentially endangered craft can be readily subsequently fitted in order to fend off the threat of missiles controlled by a seeking or homing head.

In accordance with the invention that object is essentially attained in that the defense apparatus includes the craft being equipped with a laser source whose laser beam can be directed by way of the tracking optical system of a target tracking system as a defensive beam onto the approaching missile in order to put its housing head out of operation, depending upon the respective situation in terms of proximity, disturbing pulses, overloading or destruction.

In accordance with that construction, the craft to be protected is fitted with a comparatively compact laser source whose laser beam or beams is oriented by way of a panoramic-search warning sensor with a wide field of view coarsely in the direction of the threat and is then directed by the tracking optical means of an also passive target tracking system with a substantially narrower characteristic on to the dome, which already heats up due to friction, of the fast attacking guided missile. Because of the small diameter of the portable missile which is typically equipped with an infrared homing head, the risk of the target tracking system losing the attacker again with the defense laser beam is slight as when still at a medium distance the diameter of the guided missile is markedly smaller than the cross-section of the defense beam.

The thermal homing head detector is damaged or blinded by intensity modulation of the defense beam from a pulsed laser source or (upon closer proximity) by overloading, and thereby its target tracking regulating loop is put out of operation. Comparatively low levels of energy density in the defense beam are required for that purpose, if the wavelength thereof lies in the useful band of the homing head detector. Higher levels of energy density, as occur when the situation involves closer proximity, can even result in thermal destruction of the homing head, even when using non-thermal detectors in guided missiles of larger calibre, particularly when using very short pulses in the nanosecond range.

The use of a continuous-wave or pulse laser with a high pulse rate, with a comparatively low power level, for a search and illumination beam additionally affords the advantage of a quasi-stationary regulator action in regard to the actuation of an adaptive optical system comprising a wave front detector in order in addition to optimise the focussing of a higher-energy pulsed beam in the spectrally closely adjacent wavelength range over the same mirror plate topography for compensating for atmospheric disturbances in terms of propagation. That combination of active and auxiliary beams also makes it possible for the active beam to be pivoted slightly by way of an additional deflection unit relative to the track glint of the illumination beam and thus to direct it on to a location which is thermally more sensitive but which affords poorer reflection on the homing head of the missile to be defended against. That point can be determined by way of a video camera used as a track sensor. Locking on to the small-area target before a powerful clutter background and thereafter target tracking is enhanced if the camera is scanned on to the reflex pulse from the missile to be defended against, by way of a kind of aperture shutter (which can be embodied by the suitably short-term actuation of an image amplifier), so that the pulsed energy of the defense laser beam serves at the same time as stroboscopic illumination for emphasising the target point out of the ambient clutter.

The defense apparatus according to the invention can be installed to operate in an autarchic fashion in respect of energy in a narrow container which is suspended as an external load on the craft to be protected (for example under an aircraft). That makes it possible for the container to be suspended as required for example on various aircraft.

BRIEF DESCRIPTION OF THE DRAWINGS

Additional alternatives and developments as well as further features and advantages of the invention will be apparent from the further claims and, also having regard to the information in the Abstract, from the following description of a preferred embodiment of the construction according to the invention, which is shown in the drawing in highly diagrammatic form, being restricted to what is essential. In the drawing:

Figure 1:
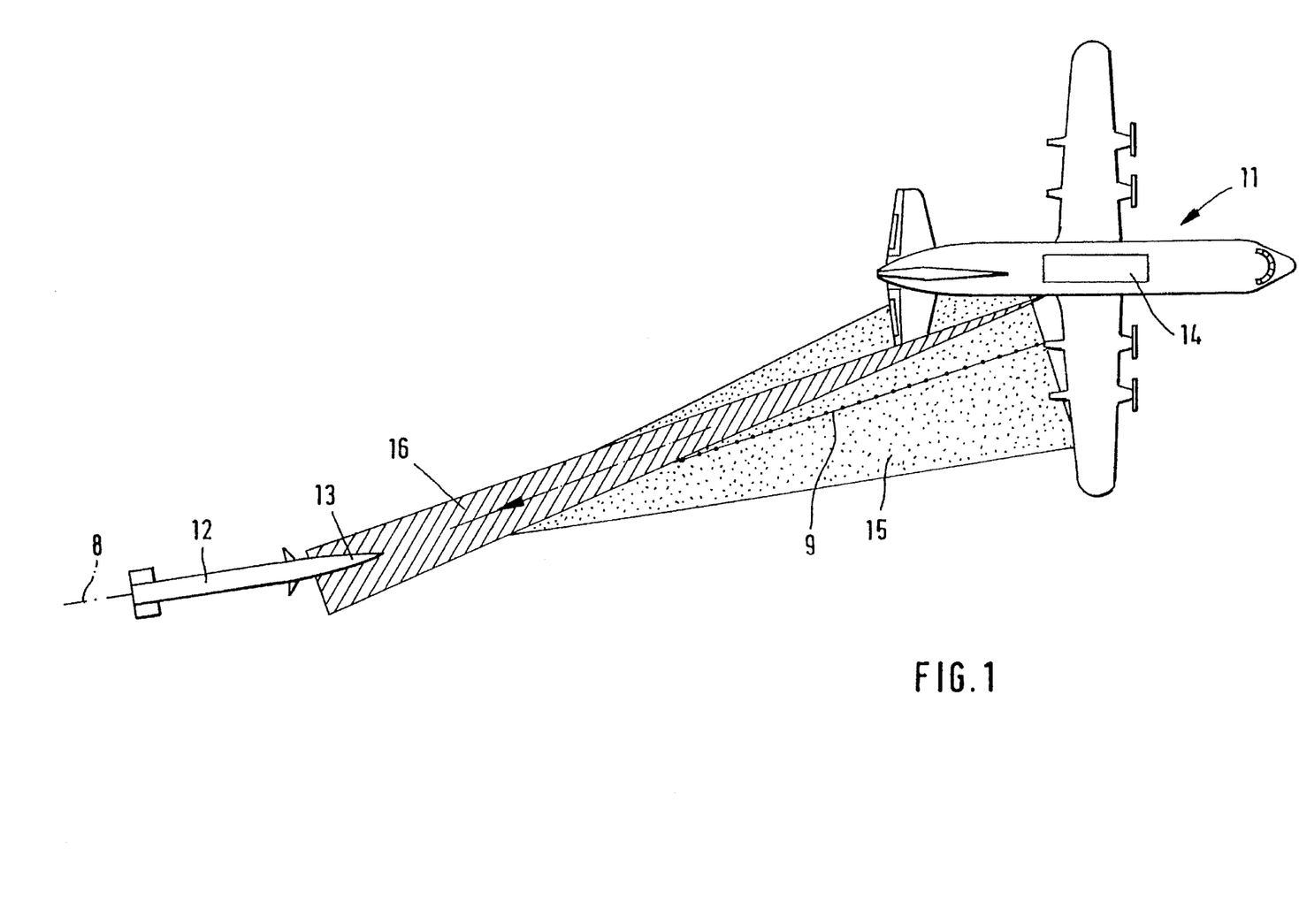
FIG. 1 shows a typical scenario of use for the defense apparatus according to the invention, against in this case an air target missile.

A vehicle or craft 11, for example a transport aircraft or airline aircraft which is comparatively slow and which in particular enjoys little manoeuvrability, as is used with aid items or production materials for humanitarian actions or for crisis reaction forces, is attacked for example when taking off or when landing, from a surprise ambush position, by a portable small-calibre guided missile 12. The optronic seeking or homing head 13 which is installed behind a dome in the tip of the guided missile 12 typically operates in the near or far infrared range of the electromagnetic radiation spectrum and has therefore locked on to an engine of the craft 11. Usually, as shown, the current flight direction 8 of the attacker differs from the actual target direction 9, up to the last phase of the approach. The guided missile 12 which therefore attacks approximately along a trailing curve or along a preplotted trailing curve would be readily able to follow any escape manoeuvres on the part of the aircraft 11 (except perhaps in the very last phase of the attack), especially as in particular during take-off and landing only highly restricted escape manoeuvres are possible. The effect of hot light sources (flares) which are discharged from the aircraft 11 on the homing head 13 of the attacker fails in particular when the missile is already too close and also when a scene assessment operation is also carried out in the pursuing (or frontally attacking) guided missile 11 in order that the actual target contour, once engaged (that is to say the endangered aircraft 11) is not lost from the attacking contact again, as a shadow in front of the background. The craft 11 therefore usually has no chance of survival against the attacking guided missile 12.

If on the other hand the potentially endangered craft 11 is equipped with a defense apparatus 14 in accordance with the present invention, then the homing head 13 whose field of view 15 has detected the craft 11 and therewith its defense apparatus 14 is caught in the sights of a defense laser beam 16. The result of that is that the infrared detector in the homing head 13 of the attacker is firstly acted upon with the interference clock frequency of a pulsed defense beam 10 and is thereby disturbed in terms of its function and, in the event of closer proximity, even overloaded and, with a still greater level of energy concentration, even thermally destroyed, that is to say the homing head 13 is so-to-speak already quickly blinded or dazzled and is at any event taken out of operation. As a result the target locking of the attacking guided missile 12 is also upset so that there is a high degree of probability that it misses its target because, in a departure from the instantaneous target direction 9, it remains on its current flight direction 8 or because it crashes as the rudder actuating system drifts into a limit abutment position. At any event, after failure of the guidance loop in the attacking missile 12, the given deviation 8–9 between the flight direction and the target direction can no longer be regulated out or corrected.

In order to be able to protect craft 11 which are to be used in an unsecured area from the threat of guided missiles 12 quickly and without involving technical problems, the defense apparatus 14 according to the invention is desirably in the form of an autarchically operational system, for aircraft 11 for example integrated in a slender container 17 which is of a streamlined shape and which can be locked for example as an outboard load under the tail or under the wing of an aircraft 11. Behind a ray-transparent dome 18 (see FIG. 2) the container 17 is provided with a tracking optical system 19 (which as diagrammatically illustrated may have a tilting mirror system) which is disposed simultaneously in the beam paths of both a target tracking system 20 and also a laser source 21 (see FIG. 3). The target tracking system 20 may be a correlation circuit as is described for example in German laid-open application (DE-OS) No 34 02 190. It is however already certainly sufficient to use a simple tracking infrared camera which is oriented by the warning sensor 10 in the direction 22 of the approaching missile 12 which stands out significantly against its surroundings by particularly hot regions, for example at the wing tips and in particular in front of the dome of its homing head 13.

Figure 2:
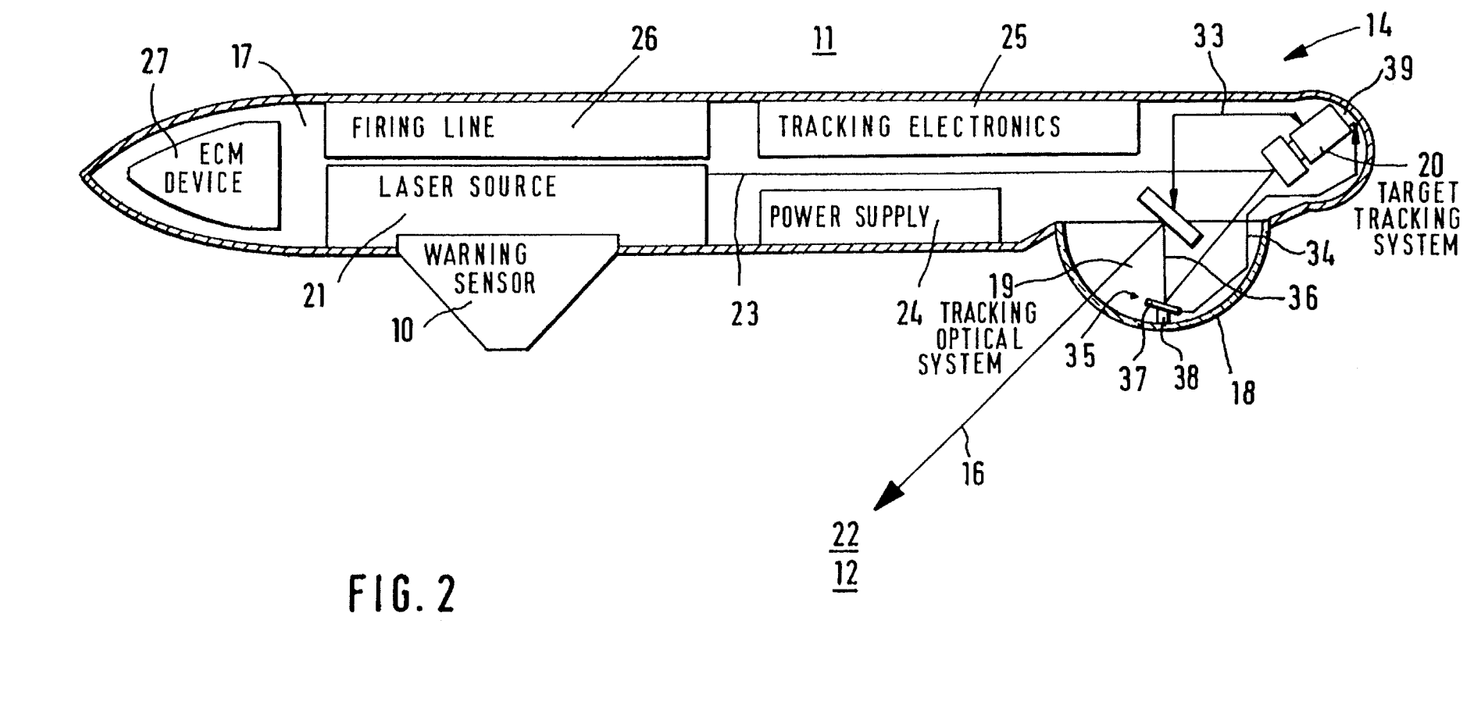
FIG. 2 is a view showing the principle of a system which can be adapted to a craft to be protected, with a defense apparatus for the scenario shown in FIG. 1.
Figure 3:
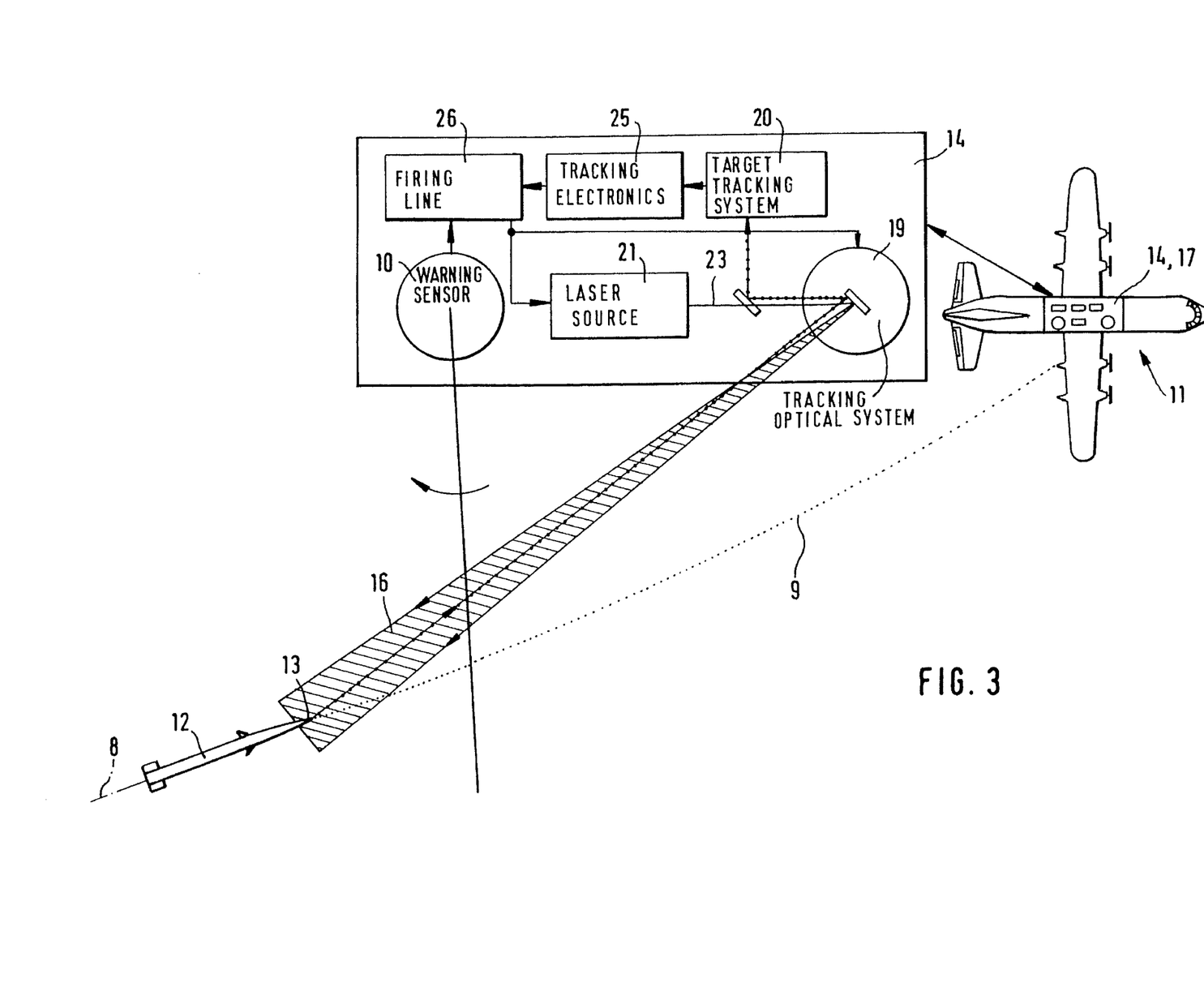
FIG. 3 shows an operational block circuit diagram for essential components in the system shown in FIG. 2.

As the target tracking system 20 operates with a narrow characteristic in respect of its defense beam 16, in order to maintain the defense direction 22 as accurately as possible, the defense apparatus $1_4$ is desirably additionally provided with a warning sensor 10 which can be a commercially available rocket warning system for searching and scanning the half-space beneath the aircraft 11. If that warning system operates in the infrared spectrum, it will possibly already detect the more intensive infrared radiation which is produced upon launch of the attacking missile 12. At any event, upon detecting a target, the warning sensor 10 which searches around with a wide field of view guides the target tracking system 20 roughly on to the direction 22 from which the threat is coming. Successive heat images of the missile 10 which is then detected can also be evaluated to ascertain whether this involves a genuine moving target and in particular a threat to the aircraft 11, while the optical system 19 for target tracking and for the defense beam 16 always remains directed along the current direction 22 to the missile 12.

The laser beam 23 which is coupled out of the laser source 21 is therefore also fed into the tracking optical system 19. The laser beam 23 then impinges as a defense beam 16 directly on the attacking missile 12 and thus the homing head 13 thereof and damages same, or in the event of the missile being sufficiently close, also dazzles or blinds it by virtue of an overload and finally possibly even causes thermal destruction thereof.

Besides the target tracking system 20 (with the optical system 19) and the laser source 21 the container 17 also contains the power supplies 24 thereof, which are autarchic or which are fed from the onboard system of the carrier, the tracking electronics 25 and a firing line 26 for activating the source 21 after the target tracking system 20 is locked on, and possibly an ECM-device 27 for radio disturbance of enemy remote control systems in the case of a radar-guided missile 12.

So that, with a dome installed at the end, both missiles 12 which attack from the front and which pursue from the, rear can be equally dazzled or blinded, a craft 11 may be provided with two such containers 17 disposed in mutually opposite orientation; or a container 17 is fitted with a dome 18 which projects in a hemispherical configuration as shown in FIG. 2 and which permits the target tracking system 20 to cover practically the entire half-space, for example below an aircraft 11 to be protected.

The use of a solid-state laser source 21 with semiconductor pump diodes 28 (see FIG. 4), which is described in greater detail for example in the journal OLE (January 1993, pages 18/19), delivers sufficient energy for thermal destruction of the detector in an enemy homing head 13. The view showing the principle of a structure of such a laser source 21 omits the cooling plates which enclose the laser rod 29 for the removal of waste heat and which if necessary contain coolant passages. Preferably, disposed in front of the resonator mirror 30 is a neodymium YAG rod 29 which is pumped from two mutually oppositely disposed longitudinal sides by means of an array of semiconductor diodes 28. A laser beam 23 is produced through the semitransparent coupling-out mirror 31, being well-focussed in such a way that in the pulse mode of operation sufficient blinding or dazzle power is already available in the defense beam 16 at a distance of some 100 m relative to the approaching missile 12.

Figure 4:
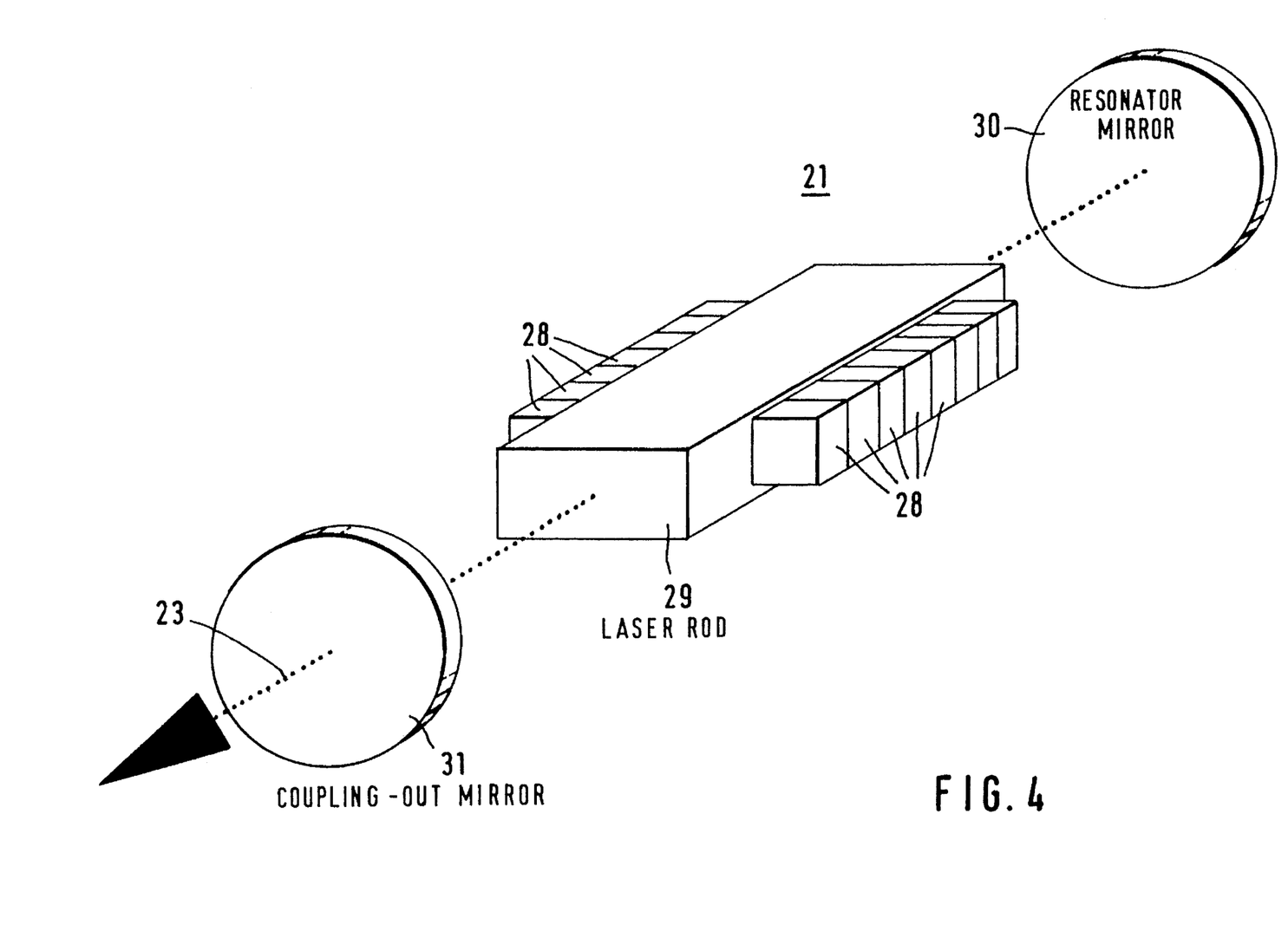
FIG. 4 is a view showing the principle of the structure of a laser source for the thermal destruction of a homing head detector or its optical system disposed in front thereof in the missile to be defended against.

It is desirable to provide for a frequency shift into the typical working band of an infrared homing head 13 in order to increase the disturbance and blinding action to a greater distance. For that purpose a non-linear crystal or an optical parametric booster can be used for example between the laser source 21 and the optical system 19 of the target tracking system 20. Specifically the use of an OPO permits tuning of the laser wavelength, whereby protection for the homing head by spectral filters is made impossible. The clock frequency in the case of the pulsed laser source 21 corresponds to the usual reticle frequency in an infrared homing head 13 or it is tuned over a typical frequency range. In that way, signal processing downstream of the thermal detector in the homing head 13 is already disturbed, even before, in the event of the missile being closer, the level of energy density in the defense beam 16 results in overloading and finally possibly even thermal destruction of the detector in the attacking homing head 13.

FIG. 2 additionally takes account of the fact (in comparison with FIG. 3) that it is desirable, besides the tracking regulating circuit 33 for target tracking in relation to the attacking missile 12 in the target tracking system 20, to provide a separate anti-vibration regulating circuit 34 in order to regulate out or correct the higher-frequency mechanical vibrations of the craft 11, being vibrations which the target tracking system 20 can scarcely follow. For that purpose the anti-vibration regulating circuit 34 is provided with an optical system 35 which is adjustable in the beam path 36 of the optical system 19 independently of the latter. The vibration tilting mirror 37, in comparison with that of the optical system 19, is of small mass and thus involves a low level of inertia. It is desirably displaceable by means of fast piezoelectric actuators 38 so that, with a suitably small regulating time constant, it can compensate for the vibrations of the craft 11 in the defense beam 16, which are currently detected by an accelerometer 39 or another sensor on the structure of the craft 11 or its defense container 17.

That fast tilting mirror 37—or a further mirror disposed in the tracking beam path 36—can also be actuated for very substantial compensation in respect of first-order atmospheric disturbances which affect propagation of the defense beam 16, at a minimum level of expenditure in terms of equipment and electronic actuating systems. For, a large part of all error influences which act on the beam parameters originate from ambient turbulence phenomena which result in an undesired beam fanning effect, which however can be adequately compensated by pivotal mirror movement about two orthogonal axes by means of quick-acting actuators (such as piezoelectric column-linear control members). Such stabilisation of the defense beam 16 has the result that it can be more easily directed on to the missile 12 to be defended against; and the higher level of energy density results in a substantial increase in range in terms of the disturbance and destruction effect in the missile 12 to be defended against, without additional apparatus expenditure in respect of beam production. Therefore that defense apparatus 14 can then also be directly used on sea vessels against sea target missiles 12 which, due to the low degree of manoeuvrability and good locatability, require a substantially greater defense distance than aircraft or land vehicles.

Figure 5:
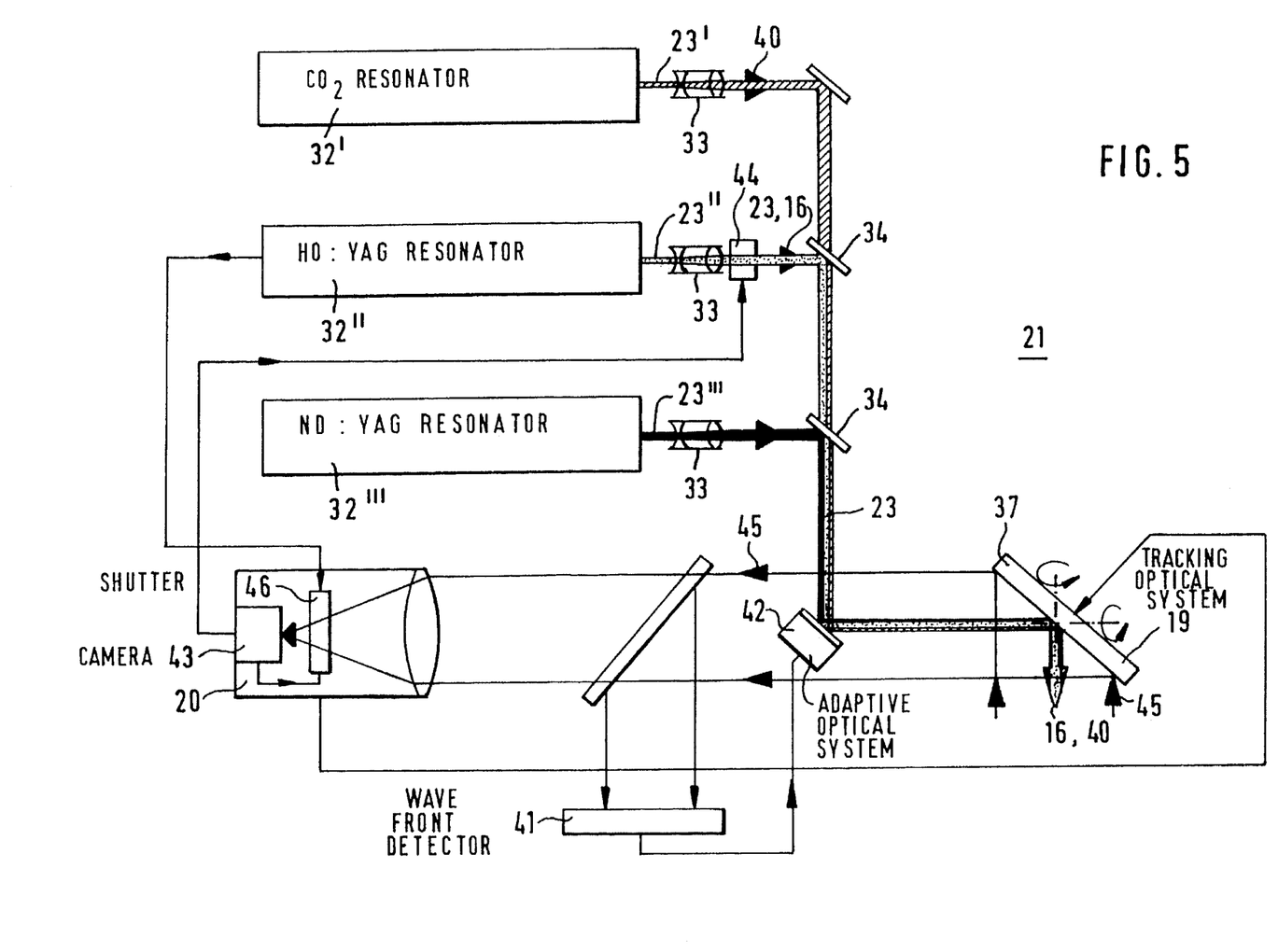
FIG. 5 shows an embodiment of a wide-band low-power laser source for blinding infrared homing heads to be defended against, with different detector useful bands.

FIG. 5 shows an example of a wide-band laser source 21 of lower power which however is certainly sufficient for the dazzle or blinding effect caused by overloading. In order to cover all working bands of typical infrared homing heads 13, the laser beams 23', 23" and 23''' of a frequency-doubled $CO_2$-resonator 32' and an Ho:YAG-resonator 32" for detector influencing in the typical useful bands and a frequency-trebled Nd:YAG-resonator 32''' against homing heads 13 for evaluating ultraviolet radiation are combined as diagrammatically illustrated by way of beam-expanding telescopes 33 and beam dividers 34 and the common tilting mirror of the optical system 19, to give the emitted defense beam 16. For optimising the beam power over the cross-section thereof, that is to say for focussing the defense beam 16 in the missile 12 to be defended against, an adaptive optical means of the above-mentioned kind can additionally be used in front of the tilting mirror of the optical system 19.

The combination laser source 21 shown in FIG. 5 can also be modified or developed in such a way that, besides at least one resonator 32" for generating the actual pulsed defense laser beam 16, it has a resonator 32' for a separate illumination beam 40 of possibly lower power in a continuous-wave mode of operation. It is focussed on a point, which provides good reflection, on the homing head 13 of the missile 12 to be defended against, by means of a multi-channel adaptive optical system 42 which is locally differently actuated by way of a wave-front detector 41, as is described in greater detail for example in German patent specification No 34 22 232 in conjunction for example with German patent specification No 40 07 321, with compensation for atmospheric disturbances which occur in the propagation path. The glint point can be the centre of the homing head optical system itself, or it may also be an optical means holder which embraces same and which, by virtue of being installed in the carrier structure in such a way as to provide for good heat insulation, is not easily damaged or even destroyed, by the thermal energy of a laser beam. A typical sensitive point in the homing head optical system of the missile 12 to be defended against, away from the reflection glint on to which the illumination beam 14 tracks, is determined by way of a camera 43 which can be the actual image camera that serves as the track sensor, visually or using automatic image processing and classification procedures, and the resonator 32" for the defense beam 16 is slightly displaced in respect of angle relative to the emission direction of the illumination beam 40 by way of a tilting mirror or the like beam deflector 44, so that the defense beam 16 acts on a more radiation-sensitive point on the homing head 13 which is to be eliminated. That is now also effected with the currently optimised focussing effect by way of the adaptive optical system 42 if the wavelength of the higher-energy defense beam 16 is not too greatly different from the wavelength of the illumination beam 40 for target point selection and optical adaptation. The mirror plate topography of the adaptive optical system 42, for the two beam frequencies which in spectral terms are relatively closely adjacent to each other, gives practically the same focussing optimisation effect in the target because the correction measure which is currently set for the auxiliary beam also applies in respect of the power beam 16 of practically the same frequency, which, because of only a slight deviation in terms of angle, on the propagation path, is confronted with practically the same atmospheric conditions as the illumination beam 40. Desirably, the sensitivity maximum of the camera 43 is displaced not only relative to the spectral wavelength of the active laser beam 16 but also relative to that of the illumination laser beam 40, for example by way of selective filtering, so that neither the auxiliary glint nor the reflection of the active mechanism in the target gives rise to overloading and thus extinction of the camera image due to the reflection energy 45.

Because of the instability of the atmospheric conditions which influence beam divergence and beam wave front, compensation thereof in the focal plane of the defense beam 16 on the missile 12 to be defended against is possible practically only by way of a control which operates continuously from the wave front detector 41 on the adaptive optical system 42, for, at a reasonable level of expenditure in terms of regulating procedure, a pulse mode of operation of the defense beam 16 would involve excessively short operating times for steady-state compensation of changes in the atmospheric conditions. On the other hand, a continous-wave power resonator 32" is highly expensive in terms of apparatus and operating procedure. In the case of the above-discussed solution of a superimposed laser source 21 however, to provide for a stable mode of operation of the adaptive optical system 42 it is sufficient to continuously generate the comparatively low-energy illumination beam 40 and thereby ensure a stable transient behaviour in respect of the regulating circuit by way of the adaptive optical system 42. It is then possible to superimpose on that quasi-steady mode of operation a pulsed power beam 16 from a pulse resonator 32" which can be used at lower cost. Thus, with a conventional adaptive optical system 42 which is set by way of the CW-illumination beam 40, it is possible to provide for focus-optimised operation of a pulsed power beam 16.

Problems may however arise in connection with locking an illumination or defense beam 40/16 on to the missile 12 to be defended against, which, of a typical diameter of less than 10 cm, must be reliably detected at a distance of several kilometers and which must be held for beam tracking purposes. Such an unclear signature which is almost only in the form of a point is difficult to make out in particular in front of the background clutter from an aircraft 11. In order to promote target locking and thus to prevent loss of target, an electromechanical or electrooptical shutter 46 can be provided (as is taken into account in FIG. 5) within the target tracking system 20 in front of the heat image camera 43. By means of the device 46, the camera 43 is scanned on to the pulsating reflection energy 45 from the pulsed defense beam 16. By way of its resonator 32", the camera is only freed when the emitted defense pulse beam 16 is terminated and as soon as the reflection energy 45 has been received the shutter 46 is closed again. Because of the high speed of light the camera 43 is thus illuminated for only a few microseconds and in that period of time it receives the full target reflection power from the missile 12. Because of the short shutter open time, even with a very high relative speed as between the missile 12 to be defended against and the craft 11 to be protected, there is no lack of exposure sharpness and the target image is free from clutter energy, that is to say free from information-less ambient radiation. The background of the only punctiform target is therefore suppressed, by its pulsating reflection radiation being so-to-speak used at the same time as stroboscopic illumination for a target image representation in order to fade the clutter out of the target image and thereby stabilise tracking of the defense beam 16 on the homing head 13 to be damaged.

We claim:

1. An apparatus (14) for defending against a missile (12) attacking an aircraft (11), said missile (12) having a thermal optronic homing head (13) for tracking said aircraft (11), said apparatus comprising:

a laser source (21) which provides a laser beam (23) that contains frequency components of operating bands of infrared detectors;

a target tracking system (20) which tracks said missile (12);

an optical tracking system (19) connected to said target tracking system (20) for initially orienting said laser beam (23) into a direction (22) approximately towards said approaching missile (12) as a pulsed defensive beam (16);

a camera (43) connected with said laser source (21), said camera having a shutter (46) synchronized to activate in response to said pulsed defensive beam (16) to receive pulses (45) reflected from said missile (12) and provide stroboscopic illumination of the pulses (45) reflected from the missile (12) to said camera (43) for precise tracking of said missile (12) until the homing head (13) of the missile (12) malfunctions due to energy received from the pulsed defensive beam (16).

2. The apparatus of claim 1, including a warning sensor (10) having a field of view to search for potential attackers, and connected to said target tracking system (20) that has a field of view narrower than the field of view of said warning sensor (10), said warning sensor (10) orienting said defensive beam (16) into said approximate direction (22) towards said missile (12) and initiating operation of said target tracking system (20).

3. The apparatus of claim 1, wherein the defensive beam (16) is pulsed at the clock rate of a homing head frequency.

4. The apparatus of claim 1, wherein the defensive beam (16) is pulsed variably relative to the frequency of the homing head (13).

5. The apparatus of claim 1, wherein the frequency components of said laser beam (23) provided by said laser source (21) are within the operating bands of the infrared detectors in the near and far IR-spectrum, and selectively in the UV-spectral band and the VIS-band, said frequency components being superimposed on each other.

6. The apparatus of claim 1, including a tilting mirror (37) which is pivotable about orthogonal axes for compensation of first-order propagation turbulences, said tilting mirror (37) stabilizing said defensive beam (16).

7. The apparatus of claim 1, wherein said laser source (21) further provides a continuous-wave illumination beam (40) directed toward said missile (12), and includes an adaptive optical system (42) having a mirror which is located in the path of said laser and illumination beams (23, 40) between said laser source (21) and said optical tracking system (19); and a wave front detector (41) connected to said adaptive optical system (42);

said laser and illumination beams (23, 40) having spectrally adjacent wavelengths, and being displaced at an angle relative to each other;

wherein a locally differing topography of said mirror of said adaptive optical system (42), controlled by said wave front detector (41), provides said laser and illumination beams (23, 40) with common compensation respecting atmospheric propagation disturbances.

8. The apparatus of claim 1, including a deflector (44) which pivots said defensive beam (16) at an angle relative to a spectrally adjacent illumination beam (40) which tracks a highly reflective point on the missile (12), said defensive beam (16) being directed to a radiation sensitive point on the missile homing head (13).

9. The apparatus of claim 1, including a sensor (39), a tilting mirror (37), and a mirror regulating circuit 34 connected to said tilting mirror (37) for decoupling said defensive laser beam (16) from vibrations detected by said sensor (39).

10. The apparatus of claim 1, wherein said apparatus is configured as an independently operable system and housed in a container (17) which is interchangeably adapted to the aircraft (11).

* * * * *